This invention relates to a leak indicator, and more particularly to an indicator which provides a visual indication of the existence of a leak in a safety valve (pressure relief valve).

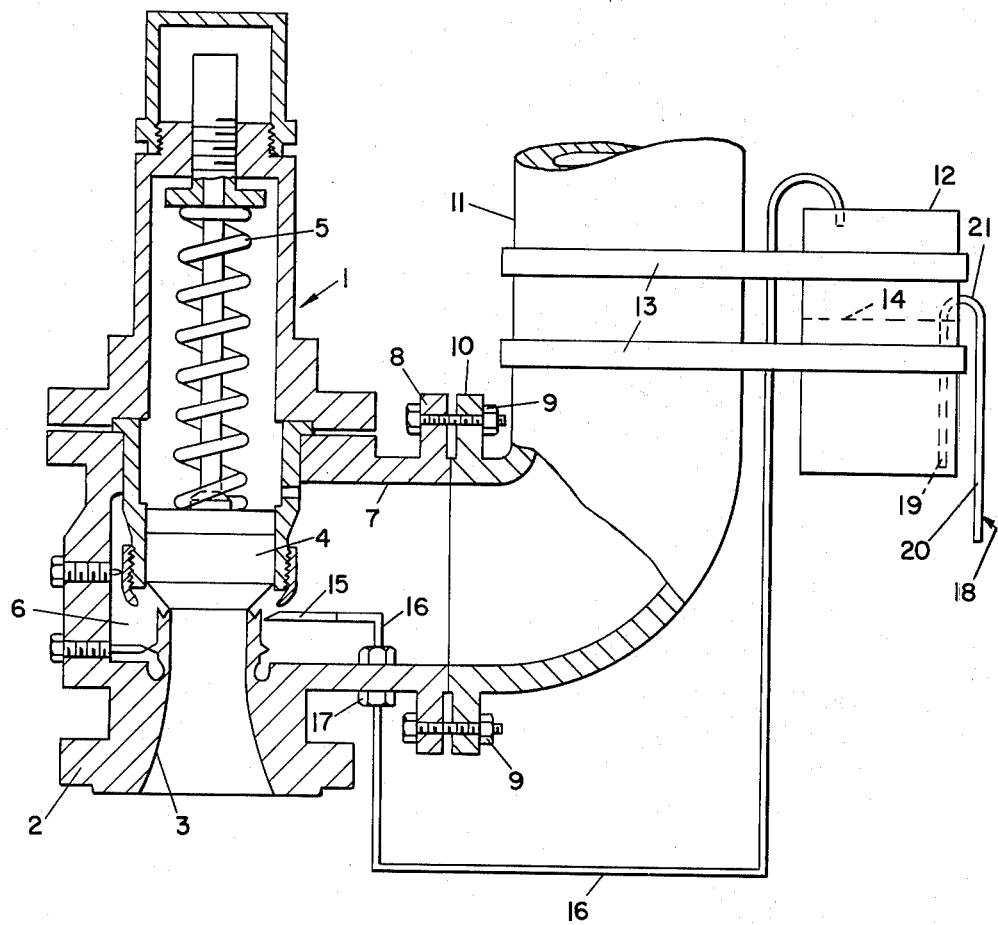
INVENTOR.
ANIBOLE BENJAMIN CHIEFFO
BY
*George L. Church*
ATTORNEY 3,233,616
LEAK INDICATOR
Anibole Benjamin Chieffo, Marcus Hook, Pa., assignor to Sun Oil Company, Philadelphia, Pa., a corporation of New Jersey
Filed Aug. 3, 1962, Ser. No. 214,631
8 Claims. (Cl. 137—145)

Safety valves (pressure relief valves) are used rather widely around petroleum refineries, for protecting many different kinds of pressure vessels. These valves vent to the atmosphere. Due to various causes (e.g., the accumulation of dirt on the valve seat), such valves often leak even though they are "closed," so it may be said that leaking safety valves are fairly common occurrence in petroleum refineries. Such leaks have in the past been rather difficult to detect, so that losses of volatile hydrocarbons may be quite appreciable before a leak is discovered.

In addition to the loss (to the atmosphere) of a valuable, saleable material, these leaks constitute a safety hazard, and also contribute, to a considerable degree, to air pollution.

It would therefore be very desirable to have available a simple, inexpensive device which will provide a rapid, visual indication of the existence of a leak in a safety or pressure relief valve. The device to be described herein satisfies the foregoing requirements.

In accordance with this invention, a receptacle is mounted adjacent the safety valve to be monitored. This receptacle contains a liquid, and the walls of the receptacle are sufficiently translucent that the liquid is visible through such walls. A pressure-transmitting coupling is provided between the atmosphere side of the safety valve and the surface of the liquid in the receptacle, so that a predetermined small superatmospheric pressure (built up by the flow of gas escaping through the safety valve) at the atmosphere side of the valve forces the liquid out of the receptacle by way of a tube constructed and arranged to operate as a siphon. Thus, the existence of a leak in the safety valve is visually indicated by the absence of liquid in the receptacle.

A detailed description of the invention follows, taken in conjunction with the accompanying drawing, wherein the single figure is a vertical section through an assembly of a typical pressure relief or safety valve and the leak indicator of the present invention.

Refer now to the drawing. The valve 1 is the safety (pressure relief) valve which is being monitored by the leak indicator of this invention. That is to say, the leak indicator of this invention has the purpose of providing a visual indication of the existence of a leak in valve 1. Valve 1 is a typical pressure relief valve, and is illustrated as being a "Crosby Nozzle Relief Valve, Style JW." At the bottom of valve 1, there is provided a downwardly-facing annular flange 2 which is adapted to be secured, as by bolts (not shown), to a vessel or other device (not shown) being protected by the valve. The body of valve 1 has therein a nozzle-like bore 3 whose lower end is coplanar with the bottom of flange 2, and which is adapted to communicate with the interior of the device being protected by valve 1. Thus, the pressure of the vessel being protected is present throughout the length of bore 3.

A valve seat is provided at the upper end of bore 3, within the body of the valve, and a disc 4, urged downwardly (loaded) by a spring 5, is mounted within the valve body and is arranged to normally contact the valve seat and close (seal) the upper end of bore 3. One end of spring 5 engages the upper side of disc 4 and the other end of this spring engages a fixed abutment in the valve body.

Surrounding the upper end of bore 3, and also the disc 4, within the valve body, there is an annular chamber 6 which communicates with the inner end of a cylindrical bore 7. The latter extends horizontally and its outer end is coplanar with the outer face of an annular flange 8 which forms the second terminus of the valve body proper. It will be recalled that the first terminus of such valve body is formed by flange 2. When disc 4 lifts off its seat, the bore 3 is placed in free communication with chamber 6 and bore 7.

Flange 8 is secured, as by bolts 9, to a matching annular flange 10 mounted at the lower end of an elbowed atmospheric vent pipe 11 whose upper end opens to the atmosphere. Thus, the bore 7 and chamber 6 communicate freely with the atmosphere, by way of pipe 11. It may therefore be appreciated that the side of the valve seat defined by chamber 6 and bore 7 may be termed the atmosphere side of the valve. The lower portion of pipe 11, adjacent flange 10, extends horizontally, in alignment with bore 7, while the upper portion of pipe 11 (i.e., the portion thereof beyond the elbow) extends vertically.

For pressure relief (or safety) purposes, the valve 1 operates in a conventional manner. That is to say, when the pressure in the protected vessel (and in bore 3) exerts an upwardly-acting force on disc 4 which is great enough to overcome the downwardly-acting force of spring 5 on the same disc, the disc rises or lifts off its seat at the upper end of bore 3, to vent this bore (and also the protected vessel) to the atmosphere, by way of chamber 6, bore 7, and vent pipe 11.

The pressure relief (safety) valve described normally provides a seal (at the upper end of bore 3) between a superatmospheric pressure (in the protected vessel) and the atmosphere. However, on occasion it may leak slightly, even though the disc 4 is seated (i.e., even though the pressure in the protected vessel is below the value required to lift the valve disc off its seat, for pressure relief action), and it is desirable to provide a visual indication of the existence of such a leak. The leak indicator of this invention, now to be described, provides such an indication.

A receptacle 12 is mounted adjacent the vertically-extending portion of vent pipe 11, as by means of a pair of brackets or clamping rings 13 which are secured to pipe 11 and clamp around receptacle 12. This receptacle contains a body of liquid 14 which may be a mixture of water, alcohol, and a suitable dye. The alcohol is included to prevent winter-time freezing of the liquid, since in a petroleum refinery safety valves such as valve 1 are ordinarily in open, exposed locations. Alternatively, the water could be omitted, so that the liquid would then comprise only alcohol and a dye. It is important that the dye be included, to provide high visibility of the liquid. The receptacle 12 is made of a transparent or translucent material, so that the liquid 14 is visible through the walls thereof. Receptacle 12 may be made from various so-called thermoplastic materials, such as polyethylene (a light-transmitting or translucent material), polypropylene, or a methyl methacrylate resin ("Lucite," a transparent material).

A nozzle 15, which is somewhat fan-shaped in a horizontal plane but which has a concavely-arcuate larger end, is mounted in bore 7, on the atmosphere side of the valve seat, with its enlarged end closely adjacent the valve disc 4 and the valve seat. The smaller or tubular end of nozzle 15 is sealed to one end of a tube 16 which is in turn sealed (as by means of a gland 17) through the valve body wall defining bore 7. The gland 17, in addition to its sealing function, supports the inner end of tube 16, and the nozzle 15, in their desired positions. Tube 16, after passing through the valve body wall, extends outwardly and upwardly toward the top of receptacle 12. This tube is sealed through the top wall of receptacle 12 and opens into the space above the liquid 14, in such receptacle. Thus, the combination of nozzle 15 and tube 16 interconnects the atmosphere side of valve 1 and the interior of receptacle 12.

An inverted U-tube 18, having two straight legs 19 and 20 joined by a curved midportion 21, is constructed and arranged to operate as a siphon, to convey liquid out of receptacle 12. For this purpose, the curved section 21 is sealed through the side wall of receptacle 12, at a point slightly above the level of the liquid 14. The inner leg 19 of tube 18 extends vertically downwardly, inside the container 12, through the liquid 14, terminating at a point just slightly above the bottom of the container, while the outer leg 20 of tube 18 extends vertically downwardly outside the container, terminating at a point sufficiently below the lower end of tube leg 19 for proper siphoning action (once the siphoning action begins).

When a leak exists in safety valve 1, a super-atmospheric pressure appears at the atmosphere side of valve 1, due to the actual escape of volatile product (or gas) outwardly from the vessel by way of this leak. This increase of pressure, built up by the escape of gas, is conveyed by nozzle 15 and tube 16 to the space above liquid 14, in container 12. When the pressure above liquid 14 increases sufficiently above atmospheric, the liquid 14 is forced up to curved tube section 21, thus starting a siphon action which then causes liquid 14 to be siphoned out of receptacle 12 (via tube legs 19 and 20) until the receptacle is substantially completely emptied of liquid. The pressure differential (with respect to atmospheric pressure) required to start the siphon action depends, among other things, on the vertical distance between the liquid level and the level of the curved midportion 21 of the tube 18, and by suitable design this pressure differential may be made as small as desired.

It may be seen that the leak indicator described provides a clear visual indication of the existence of a leak in pressure relief or safety valve 1, merely by looking at receptacle 12 from a point outside the receptacle. If at the time of examination the liquid 14 has disappeared from the receptacle 12, it is known that the safety valve 1 is leaking or has been opened and reseated. In this connection, it will be recalled that the liquid, if present in the receptacle, is clearly visible through the walls of such receptacle, due both to the color of the liquid and also to the light-transmitting properties of the receptacle walls.

The invention claimed is:

1. In combination, a pressure relief valve having a first channel for communication with a pressure vessel, a second channel for communication with the atmosphere, and a seat and cooperating closure means between said channels, said seat and closure means normally providing a seal between said channels; a receptacle containing a liquid visible through the walls of said receptacle, and means responsive to a predetermined small superatmospheric pressure on the atmosphere side of said seat for forcing at least a portion of the liquid out of said receptacle, said last-mentioned means including a tube extending between the atmosphere side of said seat and the interior of said receptacle, said tube being permanently mounted with one end adjacent the atmosphere side of said seat so as to continuously monitor the sealing efficacy of said valve while the same is in service and being located so as to not appreciably obstruct said second channel.

2. Combination in accordance with claim 1, wherein the last-mentioned means also includes a tube constructed and arranged to siphon the liquid out of said receptacle in response to a predetermined small increase of pressure in said receptacle.

3. For use with a pressure relief valve which normally provides a seal between a superatmospheric pressure and the atmosphere: a device for providing a visual indication of the existence of a leak in the valve, comprising a receptacle containing a liquid visible through the walls of said receptacle, and means responsive to a predetermined small superatmospheric pressure on the atmosphere side of said valve for forcing at least a portion of the liquid out of said receptacle, the lessened quantity of liquid in said receptacle then indicating the existence of a leak in said valve; said means including a tube constructed and arranged to siphon the liquid out of said receptacle in response to a predetermined small increase of pressure in said receptacle.

4. A device in accordance with claim 3, wherein said means also includes a tube interconnecting the atmosphere side of said valve and the interior of said receptacle.

5. For use with a pressure relief valve having a seat and cooperating closure means which normally provide a seal between a pressure vessel and the atmosphere: a device for providing a visual indication of the existence of a leak in the valve, comprising a receptacle containing a colored liquid visible through the walls of said receptacle, and means responsive to a predetermined small super-atmospheric pressure on the atmosphere side of said valve, adjacent said seat, for forcing the liquid out of said receptacle, the absence of liquid in said receptacle then indicating the existence of a leak in said valve; said last-mentioned means including a tube constructed and arranged to siphon the liquid out of said receptacle in response to a predetermined small increase of pressure in said receptacle.

6. In combination, a pressure relief valve having a first channel for communication with a pressure vessel, a second channel for communication with the atmosphere, and a seat and cooperating closure means between said channels, said seat and closure means normally providing a seal between said channels; a receptacle containing a liquid visible through the walls of said receptacle, and means responsive to a predetermined small superatmospheric pressure on the atmosphere side of said seat for forcing at least a portion of the liquid out of said receptacle, said last-mentioned means including a tube constructed and arranged to siphon the liquid out of said receptacle in response to a predetermined small increase of pressure in said receptacle.

7. Combination in accordance with claim 6, wherein the last-mentioned means also includes a tube extending between the atmosphere side of said seat and the interior of said receptacle.

8. In combination, a pressure relief valve having a first channel for communication with a pressure vessel, a second channel for communication with the atmosphere, and a seat and cooperating closure means between said channels, said seat and closure means normally providing a seal between said channels; a receptacle having light-transmitting walls and containing a colored liquid visible through such walls; and means responsive to a predetermined small superatmospheric pressure on the atmosphere side of said seat for forcing the liquid out of said receptacle, said last-mentioned means including a tube constructed and arranged to siphon the liquid out of said receptacle in response to a predetermined small increase of pressure in said receptacle.

References Cited by the Examiner

UNITED STATES PATENTS

| | | | |
|---|---|---|---|
| 1,571,657 | 2/1926 | Wilkinson | 73—46 |
| 2,644,479 | 7/1953 | Rowley | 137—312 |
| 3,097,516 | 7/1963 | Reed | 73—46 X |

ISADOR WEIL, *Primary Examiner.*